US009258992B2

(12) United States Patent
Shefer

(10) Patent No.: US 9,258,992 B2
(45) Date of Patent: Feb. 16, 2016

(54) SEE-THROUGH MANHOLE COVER

(71) Applicant: Itzhak Shefer, Givat Shmuel (IL)

(72) Inventor: Itzhak Shefer, Givat Shmuel (IL)

( * ) Notice: Subject to any disclaimer, the term of this patent is extended or adjusted under 35 U.S.C. 154(b) by 85 days.

(21) Appl. No.: 14/093,038

(22) Filed: Nov. 28, 2013

(65) Prior Publication Data
US 2014/0144067 A1    May 29, 2014

Related U.S. Application Data

(60) Provisional application No. 61/730,507, filed on Nov. 28, 2012.

(51) Int. Cl.
*A01M 29/28* (2011.01)
*A01M 29/24* (2011.01)
*E02D 29/14* (2006.01)
*F21V 33/00* (2006.01)

(52) U.S. Cl.
CPC .............. *A01M 29/28* (2013.01); *E02D 29/14* (2013.01); *F21V 33/00* (2013.01)

(58) Field of Classification Search
CPC ...... A01M 29/00; A01M 29/24; A01M 29/28
USPC ................................... 43/124, 132.1
See application file for complete search history.

(56) References Cited

U.S. PATENT DOCUMENTS

| 4,982,100 A * | 1/1991 | Harding, Jr. ............... 250/504 R |
| 5,424,551 A * | 6/1995 | Callahan ................. A01M 1/02 250/493.1 |
| 5,507,600 A * | 4/1996 | Takahashi ..................... 405/303 |
| 5,896,696 A * | 4/1999 | Stokes .................. A01M 1/226 43/124 |
| 6,718,681 B2 * | 4/2004 | Bhullar ................. A01M 1/226 340/557 |
| 6,893,186 B1 * | 5/2005 | Tello, Sr. ......................... 404/25 |
| 7,303,354 B1 * | 12/2007 | DeCroix et al. ................ 404/25 |
| 7,712,247 B2 * | 5/2010 | Wijenberg .............. A01M 1/02 43/121 |
| 8,258,977 B1 * | 9/2012 | Montestruque .......... 340/870.02 |
| 8,810,411 B2 * | 8/2014 | Marka et al. ............... 340/573.2 |
| 8,984,800 B2 * | 3/2015 | Canfield ................. A01M 1/04 250/493.1 |
| 2009/0190355 A1 * | 7/2009 | DeGinto ............... A01M 29/10 362/276 |
| 2010/0212212 A1 * | 8/2010 | Peles ............................. 43/112 |
| 2010/0226122 A1 * | 9/2010 | Tsai ..................... A01M 29/10 362/231 |
| 2011/0296735 A1 * | 12/2011 | Richter et al. ...................... 43/1 |
| 2012/0085020 A1 * | 4/2012 | Cink .............................. 43/107 |
| 2012/0263021 A1 * | 10/2012 | Connell ........................ 367/139 |
| 2013/0180466 A1 * | 7/2013 | Brown ........................ 119/713 |
| 2014/0336263 A1 * | 11/2014 | Krebs et al. .................. 514/627 |

* cited by examiner

*Primary Examiner* — Christopher P Ellis
*Assistant Examiner* — Michael Wang
(74) *Attorney, Agent, or Firm* — Blue Filament Law; Guy Levi

(57) ABSTRACT

The disclosure is directed to a manhole cover, comprising: an upper transparent disc; a lower transparent disc coupled to the upper disc; and means for emitting electromagnetic radiation at a predetermined wavelength that is narrower than full spectrum, the means for emitting electromagnetic radiation operably coupled to the lower disc, wherein: the upper disc has a diameter larger than the lower disc, and the predetermined wavelength is configured to inhibit vermin from inhabiting the volume irradiated by the means for emitting electromagnetic radiation.

24 Claims, 2 Drawing Sheets

SEE-THROUGH MANHOLE COVER

CROSS REFERENCE TO RELATED APPLICATIONS

This application is based on U.S. provisional Application No. 61/730,507, filed Nov. 28, 2012, the content of which is incorporated herein by reference in its entirety.

BACKGROUND

The disclosure generally relates to manhole covers. Specifically, the disclosure relates to manhole covers configured to inhibit vermin from inhabiting the volume beneath the manhole cover.

The presence of vermin in sewage systems, have long been documented and is considered an area of constant concern for sanitation workers, exterminators and the general public. Examples include rats, mice, snakes and insects.

Cockroaches have likewise been long recognized as pests of economic, medical, veterinary, and aesthetic concern.

Sundry formulations and mechanisms are routinely synthesized and employed to discourage or prevent cockroach infiltration and infestation within otherwise attractive areas and volumes (in other words, homes and buildings in residential areas). No real-world application of any reported technology is known to be operationally safe and effective. It has been well established that the area enclosed beneath manhole covers is attractive to cockroach infestation by virtue of its warmth and secluded areas (in other words, darkness) and volumes; causing exposure risks (both in terms of potential disease vectors and insecticides), financial loss resulting from loss of operating time, incurred liabilities, repair costs, and replacement costs.

Accordingly, what is needed, is a cockroach and other vermin repellent mechanism which would inhibit access to these sensitive areas by activating a natural mechanism of dissuasion, and provide an effective advantage for humans.

SUMMARY

Disclosed, in various embodiments, are manhole covers configured to inhibit vermin from inhabiting the volume below the manhole cover.

In an embodiment, provided herein is a manhole cover, comprising: an upper transparent disc; a lower transparent disc coupled to the upper disc; and means for emitting electromagnetic radiation at a predetermined wavelength that is narrower than full spectrum, the means for emitting electromagnetic radiation operably coupled to the lower disc, wherein: the upper disc has a diameter larger than the lower disc, both the upper disc and the lower disc are transparent, and the predetermined wavelength is configured to inhibit vermin from moving in the area irradiated by the means for emitting electromagnetic radiation.

In another embodiment, provided herein is a method of inhibiting vermin from moving below a manhole cover, comprising: a. providing a manhole cover, the manhole cover comprising An upper transparent disc; A lower transparent disc coupled to the upper disc; and means for emitting electromagnetic radiation at a predetermined wavelength that is narrower than full spectrum, wherein the upper disc has a diameter larger than the lower disc, both the upper disc and the lower disc are transparent and the predetermined wavelength is configured to inhibit vermin from moving in the area irradiated by the means for emitting electromagnetic radiation; and b. illuminating the area below the manhole. The diameter of the upper disc, or in certain embodiments, a single disc comprising the components described, can have a diameter of between about 30 cm and about 200 cm, for example, between about 30 cm and about 180 cm, or between about 50 cm and about 160 cm, specifically, between about 50 cm and about 140 cm, or between about 50 cm and about 120 cm, more specifically, between about 50 cm and about 100 cm, or between about 50 cm and about 80 cm. A person skilled in the art would readily recognize that the cover described herein can have shapes other than a disc and may encompass surfaces of any polygon having sides equal to or greater than 3.

In yet another embodiment, provided herein is a kit for modifying a manhole cover for inhibiting vermin from inhabiting the volume beneath a manhole cover, comprising: a light emitting diode array light (LED), configured to emit light at a predetermined peak wavelength; means for powering the LED; power level indicator; packaging; and instructions.

These and other features of the manhole covers configured to inhibit vermin from inhabiting the volume below the manhole cover will become apparent from the following detailed description when read in conjunction with the drawings, which are exemplary, not limiting, and wherein like elements are numbered alike in several figures.

BRIEF DESCRIPTION OF THE FIGURES

For a better understanding of the manhole covers configured to inhibit vermin from inhabiting the volume below the manhole cover, with regard to the embodiments thereof, reference is made to the accompanying drawings, in which like numerals designate corresponding elements or sections throughout and in which.

DESCRIPTION

Figure 1:
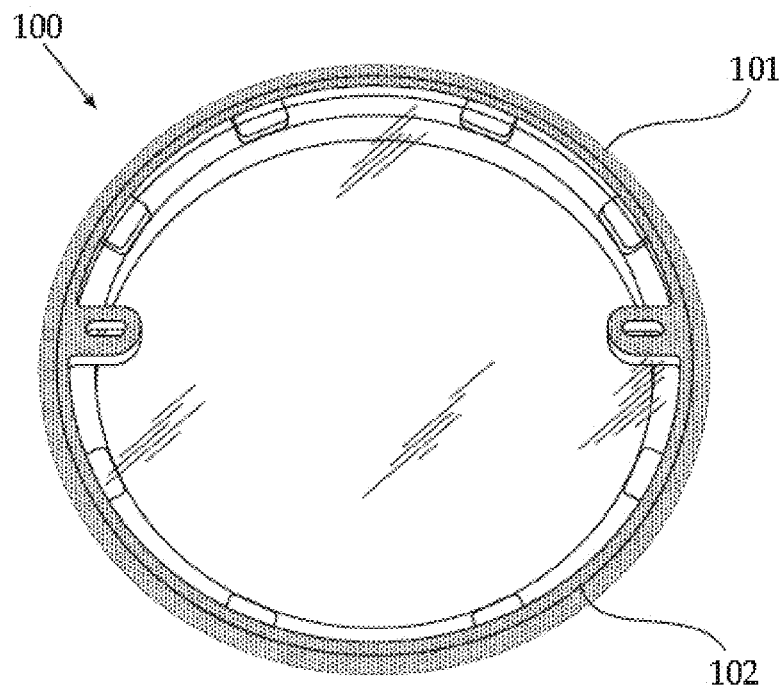
FIG. 1, illustrates a top view of an embodiment of the manhole cover

Provided herein are manhole covers configured to inhibit vermin from inhabiting the volume below the manhole cover and methods of inhibiting vermin from inhabiting the volume below the manhole cover. By providing these manhole covers in different materials, certain advantages can be derived, such as by reducing the weight and heat transfer coefficient of the manhole covers requiring precise manufacturing and that have low variability tolerance, thereby reducing temperature in the volume below the manhole cover, and manufacturing complexity, while maintaining transparency of the manhole cover. In addition, making the manhole cover from transparent materials, allows sunlight to illuminate the volume beneath the manhole thus repelling vermin that prefer the darkness from entering and inhabiting the volume beneath the manhole. Moreover, the transparent material forming the manhole cover can be configured in lens form, magnifying the image of the volume beneath the manhole cover thus improving inspection.

In addition, providing means for illuminating the volume beneath the manhole cover with an electromagnetic radiation at predetermined peak wavelength emission configured to be at the wavelength of highest sensitivity to vermin that may occupy the volume beneath the manhole cover, can further repel, inhibit, or dissuade the vermin from inhabiting that volume.

Accordingly, and in an embodiment, provided herein is a manhole cover, comprising: an upper transparent disc; a lower transparent disc coupled to the upper disc; and means for emitting electromagnetic radiation at a predetermined wavelength that is narrower than full spectrum, the means for emitting electromagnetic radiation operably coupled to the lower disc, wherein: the upper disc has a diameter larger than the lower disc, both the upper disc and the lower disc are transparent, and the predetermined wavelength is configured to inhibit vermin from moving in the area irradiated by the means for emitting electromagnetic radiation. In certain embodiments, the means for emitting electromagnetic radiation provide full spectrum emission in repelling vermin from inhabiting the volume beneath the cover.

The term "vermin" refers in a non-limiting sense, as being merely representative of the great variety of insects, rodents and other pests that someone of ordinary skill in the art would easily recognize as being proper targets of the manhole cover and method taught herein.

The manhole cover described herein, which can be used in the methods provided, can have see-through clarity. The term "see-through clarity" used herein refers to an easiness with which a target can be visually recognized through the manhole cover and can be specified by total luminous transmittance and/or parallel luminous transmittance. As used herein, the see-through clarity is described to become lower as the luminous transmittance decreases. "See-through" encompasses any characteristic that allows visual inspection through a wall. Specifically, a viewing window, or the entire manhole cover may be translucent, transparent, or entirely clear. "Translucent" indicates that light can pass through the layer, but the light is diffused. It does not require that a whole surface or an article itself is transparent and portions of the article may be transparent or opaque, for example to serve a function or to form a decorative pattern. The term "translucent" as used herein could refer to a thermoplastic manhole cover composition that transmits at least 60% in the region ranging from 250 nm to 700 nm with a haze of less than 40%. For example, the composition can have a transmission of at least 75%. In another embodiment, the composition has a transmission of at least 85%. In yet another embodiment, the composition has a haze of less than 40%, and in another embodiment, the composition has a haze of less than 10%. In another embodiment, the composition has a haze of less than 5%.

"Transparent" refers to a thermoplastic manhole cover composition capable of at least 70% transmission of light. Likewise the term "transparent" as used herein would also refer to a thermoplastic manhole cover composition that transmits at least 70% in the region ranging from 250 nm to 700 nm with a haze of less than 10%.

The term "inhibit" refers to the act of diminishing, suppressing, dissuading, preventing, reducing or eliminating, either directly or indirectly, a function, activity, or behavior relative to the natural, expected, or average or relative to current conditions. The term "suppress" may be used interchangeably with "inhibit." For example, the manhole covers described herein may inhibit vermin having dichromatic vision from inhabiting the volume beneath the manhole cover.

The means for emitting electromagnetic radiation at a predetermined wavelength can comprise a light emitting diode, configured to emit light at the predetermined peak wavelength, configured to elicit an inhibitory effect on the vermin sought to be repelled from the volume beneath the manhole cover. For example, the vermin sought to be repelled can have a dichromatic vision, referring to the types of cones on the vermin's eye and the manhole cover can have means for emitting electromagnetic radiation (in other words, emit light) at the peak sensitivity of the cones present in the retina of the vermin sought to be repelled. Specifically, the vermin sought to be repelled can be a rat and the peak wavelength can be between about 500 and 515 nm, or 510 nm for one type of cones, and the second peak wavelength can be between 355 nm and 370 nm, or 359 nm. In another embodiment, the vermin sought to be repelled can be a cockroach and the peak wavelength can be between about 500 and 510 nm, or 507 nm for one type of cones, and the second peak wavelength can be between 360 nm and 370 nm, or 365 nm. In yet another embodiment, the vermin sought to be repelled can be a snake and the peak wavelength can be between about 540 and 560 nm, or 550 nm for one type of cones, and the second peak wavelength can be between 355 nm and 370 nm, or 361 nm. In another embodiment, a third wavelength can be used at peak of between about 425 nm and about 450 nm.

In addition, the means for emitting electromagnetic radiation can be a strobe light configured to emit high intensity flashes of electromagnetic radiation (in other words, the light at the predetermined wavelength) in a range equal to or greater than 100,000 candlepower in a pattern configured to optimally interfere with functioning of the vermin sought to be repelled. Flashing a high intensity light in a continuously repeated pattern may facilitate disrupting the living pattern of pests inhabiting the volume beneath the manhole cover, which consequently provokes the pests to abandon the volume beneath the manhole cover. Pests that are sensitive to light, such as rodents, birds, insects, mammals, reptiles, etc., may be repelled using the manhole cover described herein. Likewise, insects such as, for example, cockroaches, spiders, bees, ants, and the like, are affected by high intensity strobe light.

It should be understood, that the source of electromagnetic light can be any source (including tunable sources) capable of emitting electromagnetic radiation at the predetermined wavelength described, whether directly or as an incident light passing through filters, prisms and the like. Accordingly, the light can be a halogen light, or a fiber optic light guide tube and the like.

The manhole cover can be powered, for example by solar panels embedded within the upper disc, or at a close-by location whereby the solar panel is operably coupled to the electromagnetic radiation emitting means. In addition, the electromagnetic radiation emitting means can be powered by batteries or be connected to the local power grid. The manhole cover can further comprise an indicator of the power provided by, for example a battery. The indicator can be a light indicator (e.g., would light or change colors, when power is lower than a given threshold), a transceiver capable of sending an alert to a user (e.g., on a hand-held device over wireless networks) and the like.

In addition, the manhole cover can further comprise a light sensor configured to start the electromagnetic radiation emitting means when the light in the environment above the manhole cover is diminished to a predetermined level for a period of time longer than determined to be a mere interference above the cover, for example, a passing vehicle. During the day, sunlight from the environment enters the manhole cover, illuminates the space beneath the manhole cover and together with the vibration and noise would ostensibly inhibit and/or dissuade vermin from inhabiting the volume beneath the manhole cover. At dusk, or when covered with snow or when other dark conditions manifest, the light sensor will activate the electromagnetic radiation emitting means (in other words, the LED lights) to emit light at the wavelength most disruptive to the functionality of the vermin sought to be inhibited and, when available, at strobe frequencies determined to be optimal for disrupting functionality of the vermin at the volume beneath the manhole cover.

Accordingly, provided herein a method of inhibiting vermin from inhabiting the volume below a manhole cover, comprising: a. providing the manhole cover described herein; and b. illuminating the area below the manhole at predetermined wavelength configured to inhibit vermin from inhabiting the volume beneath the manhole.

The upper disc, the lower disc or, in certain embodiments, a single disc comprising the components described, of the manhole cover can be made of transparent thermoplastic material, that can be ductile. Possible thermoplastic materials include polybutylene terephthalate (PBT); acrylonitrile-butadiene-styrene (ABS); polycarbonate; polycarbonate/PBT blends; polycarbonate/ABS blends; copolycarbonatepolyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO), as well as filled (e.g., glass filled) materials of above resins. In addition, the discs can be reinforced with filler, for example, glass fibers (e.g., glass fibers having length of between 1 and 12 mm). The upper disc or, in certain embodiments, a single disc comprising the components described, can alternatively be made of glass, which could be tempered glass, to induce permanent compressive stress or compression on the surfaces of the glass disc, thereby forming a tempered glass disc. Tempering the glass can strengthen glass in which a break would typically result in fracturing beyond the immediate area of the breakage to the perimeter of the pane (e.g., crack propagation).

The upper disc or, in certain embodiments, a single disc comprising the components described, can further be coated with a protective coating. the term "protective coating" refers to a layer constituting a physical protection from the transparent upper disc, lower disc, or both. A faceplate, a film, a foil or a scratch-proof layer are examples of such a protective coating. The protective layer, when deposited onto a surface, provides protection of that surface from degradation due to surrounding environmental conditions in order to retain the integrity of that surface. Non-limiting examples of degradation due to environmental conditions include oxidation and light degradation, and the like. In addition, a protective coating can possess mechanical properties such as scratch and mar resistance. The protective layer may be referred to as a back sheet. The protective layer protects the transparent upper disc, lower disc, or both from being damaged by external impact, and from moisture penetrating through an exposed side of the transparent upper disc, lower disc, or both. The protective layer is robust to a high-temperature and high-humidity environment, and may include an insulating and durable material. In one exemplary embodiment, a thin film with fluoropolymer-polyester-fluoropolymer sequentially stacked therein may be used as the protective layer.

As examples, the protective layers used to coat the transparent upper disc, lower disc, or both, may include an inorganic composition such as diamond-like carbon ("DLC"), aluminum nitride, silicon dioxide, $C_2N_2$, or a mixture of two or more of the foregoing. Other examples of the protective layer can be an organic composition such as a poly(olefin), poly(vinyl chloride), poly(styrene), poly(fluoroethylene), poly(acrylate), poly(vinyl acid ester), poly(carbonate), poly (ester), poly(urethane), poly(amide), poly(unsaturated ester), poly(acrylonitrile butadiene styrene), poly(styrene acrylonitrile), or a mixture of two or more of the foregoing or including one or more inorganic compositions.

The upper disc or, in certain embodiments, the single disc, may further comprises UV-absorbing agent or layer. The UV absorber layer suitable for the transparent upper disc, lower disc, or both can comprise any UV absorber well known to persons having ordinary skill in the art, for example, a benzotriazole, a benzotriazine, a benzophenone, a salicylic acid derivative, or a combination comprising at least one of the foregoing.

Because of temperature differences between the cover and the volume beneath, together with potentially high humidity, water may condense on the lower surface of the lower disc, or in certain embodiments, the single disc, which may affect the effectiveness and/or efficiency of the components configured to inhibit vermin from occupying the volume beneath the cover. Accordingly, in certain embodiments, the lower surface of the lower disc, or the single disc, may comprise means for inhibiting condensation on the lower surface covering the volume beneath the cover. These means can be metal filaments embedded in the lower disc or the single disc, which may be operably coupled to the same power source used to power the electromagnetic means, and used to heat the filaments so that the surface reaches a temperature above the corresponding dew point. Other means may be incorporating within the lower disc, or a portion of the single disc, a chamber configured to accommodate a heating liquid (e.g., silicone oil and the like), operably coupled to the power source used to power the electromagnetic means, likewise used to heat the surface so that it reaches a temperature above the corresponding dew point. Sensors measuring equilibrium relative humidity (% ERH) could be installed and used to activate the means for preventing condensation at predetermined % ERH.

The thermoplastic material forming the transparent upper disc, transparent lower disc, or both upper and lower discs, or in certain embodiments, a single transparent disc used in the manhole covers and methods provided herein can have the properties as described in the following table:

| Property | Test | Units | Manhole Cover* |
| --- | --- | --- | --- |
| Refractive Index at 23° C. | ASTM D452 | — | 1.58-1.59 |
| Light Transmission 3 mm slab | ASTM D1003 | % | ≥80 |
| Flexural Strength | ASTM D790 | Psi | ≥13,000 |
| Coefficient of Thermal Expansion | ASTM D696 | μm/m · K | 65-70 |
| Coefficient of Thermal Conductivity | ASTM C177 | W/m · K | 0.19-0.22 |

A more complete understanding of the components, methods, and devices disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof, their relative size relationship and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The method described herein can be used to modify existing manhole cover to be able to inhibit vermin from inhabiting the volume beneath a manhole cover. Accordingly, provided herein is a kit for modifying a manhole cover for inhibiting vermin from inhabiting the volume beneath a manhole cover, comprising: a light emitting diode array light (LED), configured to emit light at a predetermined peak wavelength; means for powering the LED; power level indicator; packaging; and instructions.

The term "modify" refers to changes made to an existing manhole cover used at any specific location. These may include metal manhole covers.

A person skilled in the art would readily recognize, that other than the manhole cover as described herein (e.g., the upper transparent disc and the lower transparent disc), the kit described herein can have any of the features of the manhole cover described hereinabove.

Figure 2:
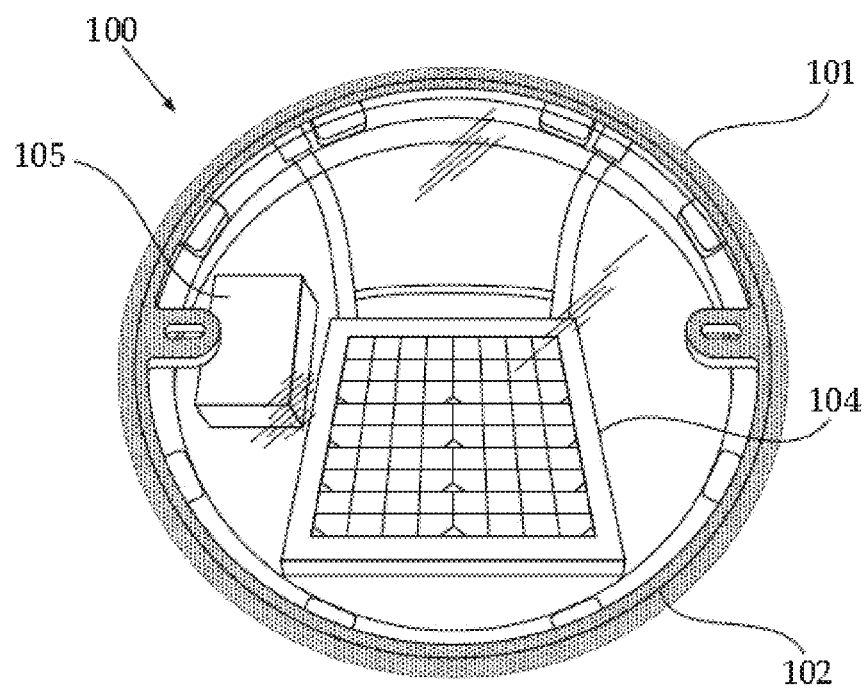
FIG. 2, illustrates a top view of another embodiment of the manhole cover
Figure 3:
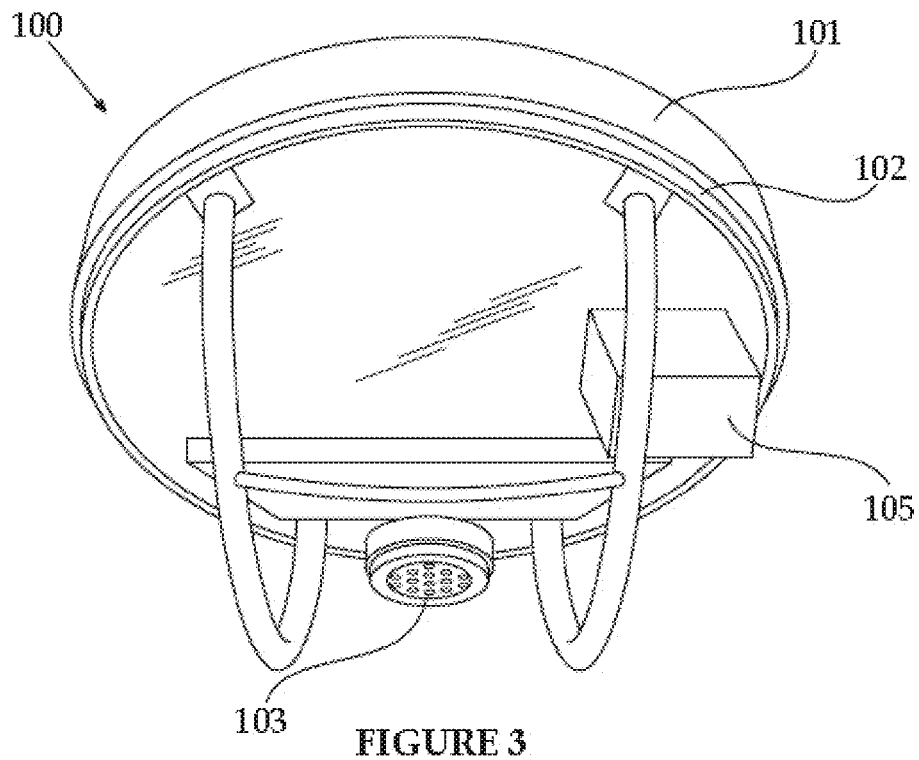
FIG. 3 illustrates a bottom isometric view of an embodiment of the manhole cover showing various components.
Figure 4:
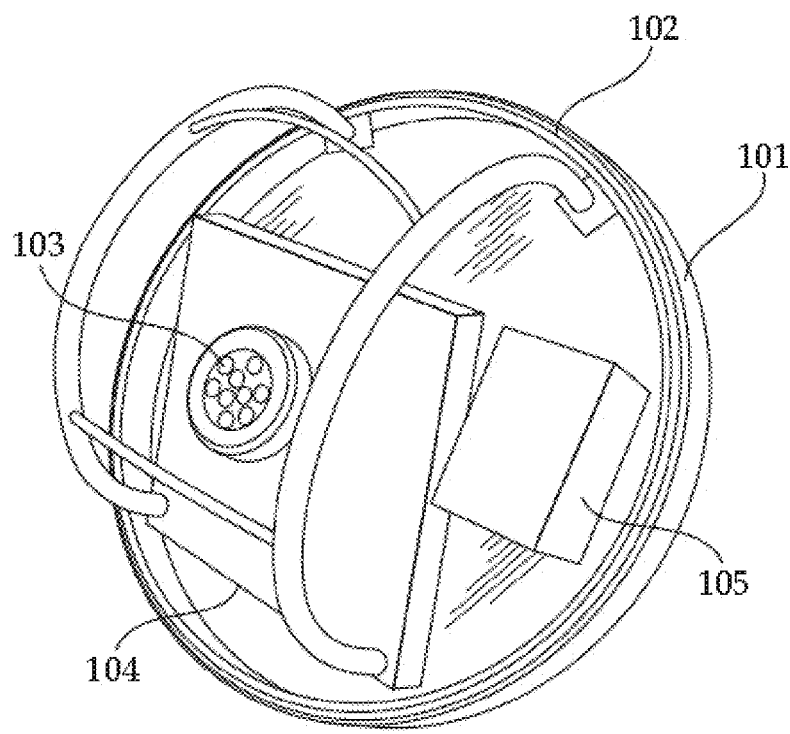
FIG. 4, illustrates another bottom perspective view of an embodiment of the manhole cover, showing the components of FIG. 3 from another angle.

Turning now to FIGS. 1-4, showing the manhole cover 100 having an upper transparent disc 101, with a diameter that is larger than the diameter of a lower transparent disc 102 (see e.g., FIG. 3), with LED lights 103, (see e.g., FIGS. 3, 4) embedded within the lower transparent disc or on a dedicated platform that can either be transparent or not (see e.g., FIGS. 3, 4). Also shown in FIGS. 1, 2, and 4 is solar panel 104 configured to power LED lights $103_{i-j}$, wherein solar panel 104 can be embedded within upper disc 101. Light sensor 105 (see e.g., FIGS. 2-4), can be integrated into the upper disc, or in another embodiment, integrated into the solar panel, or both, is also shown.

Turning now to FIG. 3, showing the manhole cover 100 having an upper transparent disc 101, with a diameter that is larger than the diameter of a lower transparent disc 102, with LED lights 103, embedded within the lower transparent disc. Although FIG. 2-4 show a circular orientation of LED lights $103_{i-j}$ embedded within the lower transparent disc, other configurations are likewise contemplated. LED lights $103_{i-j}$ can be configured to emit light at peak wavelength between about 500 to about 515 nm (e.g., green LED) and/or at peak wavelength between about 355 to about 370 nm (e.g., blue LED), and also configured to strobe at a frequency between about 1.0 Hz and 1.0 MHz at a strength (in other words, luminous intensity) of between about $10^5$ and $1.5\times10^6$ candella (cd). Also shown in FIG. 2-4, is solar panel 104 configured to power LED lights $103_{i-j}$ embedded within the lower transparent disc, wherein solar panel 104 can be embedded within upper disc 101. Light sensor 105, can be integrated into the upper disc, or in another embodiment, integrated into the solar panel, or both. Also shown in FIGS. 3, and 4 are brackets that can be used to couple the various components to the upper disk 101.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The term "coupled", including its various forms such as "operably coupling", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection. The term "ductile" used herein in accordance with common usage in the art to refer to materials that exhibit significant elongation before break and/or shear yielding in response to an applied force or load during a tensile exposure. In other words, the term "ductile" refers to materials capable of undergoing substantial deformation, e.g., during processing without breaking.

The term "about", when used in the description of the technology and/or claims means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such and may include the end points of any range provided including, for example ±25%, or ±20%, specifically, ±15%, or ±10%, more specifically, ±5% of the indicated value of the disclosed amounts, sizes, formulations, parameters, and other quantities and characteristics.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

I claim:

1. A cover, comprising:
an upper transparent disc;
a lower transparent disc coupled to the upper disc; and
means for emitting electromagnetic radiation at a predetermined wavelength, the means for emitting electromagnetic radiation operably coupled to the lower disc, wherein:
the upper disc has a diameter larger than the lower disc, and
the predetermined wavelength is configured to inhibit vermin from inhabiting the volume irradiated by the means for emitting electromagnetic radiation.

2. The cover of claim 1, further comprising a solar panel, a battery, or a combination thereof, operably coupled to the means for emitting electromagnetic radiation.

3. The cover of claim 2, further comprising means for inhibiting condensation on a lower surface of the cover.

4. The cover of claim 3, wherein the means for inhibiting condensation comprise metal filaments embedded in the lower disc the filaments being operably coupled to the solar panel, battery, or their combination.

5. The cover of claim 3, wherein the means for inhibiting condensation comprise a chamber in the lower disc, configured to accommodate a heating liquid, operably coupled to the solar panel, battery or their combination.

6. The cover of claim 2, wherein the means for emitting electromagnetic radiation at a predetermined wavelength comprises LED lights disposed on a dedicated platform configured to emit light at a peak wavelength of between 355 nm to about 370 nm and at a peak wavelength of about 500 nm to about 515 nm.

7. The cover of claim 1, wherein the means for emitting electromagnetic radiation comprise a light emitting diode array light.

8. The cover of claim 7, wherein the light emitting diode array light is configured to emit light at a peak wavelength of about 507 nm.

9. The cover of claim 8, wherein the light emitting diode array light is a strobe light configured to emit between about 5 μs and about 15 μs high-intensity flashes of light in a range equal to or greater than 100,000 candela in a repeated predetermined pattern.

10. The cover of claim 7, wherein the light emitting diode array light is configured to emit light at a peak wavelength of about 365 nm.

11. The cover of claim 1, further comprising a light sensor, configured to initiate the emission of electromagnetic radiation at a predetermined environmental light level above the manhole.

12. The cover of claim 11, wherein the vermin is a cockroach of the genus *Periplaneta*.

13. A method of inhibiting vermin from inhabiting the volume beneath a manhole cover, comprising:
 a. providing a manhole cover, the cover comprising an upper transparent disc; a lower transparent disc coupled to the upper disc; and means for emitting electromagnetic radiation at a predetermined wavelength that is narrower than full spectrum, wherein the upper disc has a diameter larger than the lower disc, and the predetermined wavelength is configured to inhibit vermin from inhabiting the volume irradiated by the means for emitting electromagnetic radiation; and
 b. illuminating the area below the manhole.

14. The method of claim 13, wherein the cover further comprises a solar panel operably coupled to the means for emitting electromagnetic radiation.

15. The method of claim 13, wherein the means for emitting electromagnetic radiation comprise a light emitting diode array light (LED).

16. The method of claim 15, wherein the light emitting diode array light is configured to emit light at a peak wavelength of about 507 nm.

17. The method of claim 15, wherein the light emitting diode array light is configured to emit light at a peak wavelength of about 365 nm.

18. The method of claim 15, wherein the light emitting diode array light is a strobe light configured to emit high intensity flashes of light in a range equal to or greater than 100,000 candela in a repeated predetermined pattern.

19. The method of claim 13, wherein the cover further comprises a light sensor, configured to initiate the emission of electromagnetic radiation at a predetermined environmental light level above the manhole.

20. The method of claim 13, wherein the vermin is a cockroach of the genus *Periplaneta*.

21. A kit for modifying a cover for inhibiting vermin from inhabiting the volume beneath a manhole cover, comprising:
 a light emitting diode array light (LED), configured to emit light at a predetermined peak sensitivity wavelength of the cones present in the retina of the vermin;
 means for powering the LED;
 power level indicator;
 packaging; and
 instructions.

22. The kit of claim 21, wherein the means for powering the LED is a battery, a solar panel or a combination comprising one of the foregoing.

23. The kit of claim 21, wherein the predetermined peak wavelength of the LED is between about 505 and about 520 nm.

24. The kit of claim 21, wherein the predetermined peak wavelength of the LED is between about 355 and about 370 nm.

* * * * *